United States Patent
Henkenjohann et al.

(10) Patent No.: US 11,078,390 B2
(45) Date of Patent: *Aug. 3, 2021

(54) ADHESION PROMOTER COMPOSITIONS AND PRIMER COMPOSITIONS FOR METAL-PLASTIC HYBRID COMPONENTS

(71) Applicants: Evonik Operations GmbH, Essen (DE); SI-Coatings GmbH, Wuppertal (DE)

(72) Inventors: Willi Henkenjohann, Wuppertal (DE); Karl Kuhmann, Duelmen (DE); Maximilian Gruhn, Marl (DE); Andreas Pawlik, Recklinghausen (DE); Martin Risthaus, Olfen (DE); Klaus Welsch, Breckerfeld (DE); Sven Mang, Hagen (DE)

(73) Assignees: Evonik Operations GmbH, Essen (DE); SI-Coatings GmbH, Wuppertal (DE)

( * ) Notice: Subject to any disclaimer, the term of this patent is extended or adjusted under 35 U.S.C. 154(b) by 70 days.

This patent is subject to a terminal disclaimer.

(21) Appl. No.: 16/282,739

(22) Filed: Feb. 22, 2019

(65) Prior Publication Data

US 2019/0185724 A1   Jun. 20, 2019

Related U.S. Application Data

(62) Division of application No. 14/764,408, filed as application No. PCT/EP2014/051695 on Jan. 29, 2014, now Pat. No. 10,273,390.

(30) Foreign Application Priority Data

Jan. 29, 2013   (DE) ..................... 10 2013 201 392.2

(51) Int. Cl.

| | |
|---|---|
| C09J 163/00 | (2006.01) |
| C09J 177/02 | (2006.01) |
| C09J 177/06 | (2006.01) |
| B32B 7/12 | (2006.01) |
| B32B 15/08 | (2006.01) |
| C09J 5/06 | (2006.01) |
| C08G 18/80 | (2006.01) |
| C08G 59/40 | (2006.01) |
| C08G 59/62 | (2006.01) |
| C09J 175/04 | (2006.01) |
| C08L 61/06 | (2006.01) |
| C08L 63/00 | (2006.01) |
| C08L 75/04 | (2006.01) |
| C08L 77/00 | (2006.01) |
| B32B 15/092 | (2006.01) |
| C09J 167/00 | (2006.01) |
| C09J 177/00 | (2006.01) |

(52) U.S. Cl.
CPC ............ *C09J 163/00* (2013.01); *B32B 7/12* (2013.01); *B32B 15/08* (2013.01); *B32B 15/092* (2013.01); *C08G 18/8061* (2013.01); *C08G 59/4028* (2013.01); *C08G 59/621* (2013.01); *C08L 61/06* (2013.01); *C08L 63/00* (2013.01); *C08L 75/04* (2013.01); *C08L 77/00* (2013.01); *C09J 5/06* (2013.01); *C09J 167/00* (2013.01); *C09J 175/04* (2013.01); *C09J 177/00* (2013.01); *C09J 177/02* (2013.01); *C09J 177/06* (2013.01); *B32B 2255/06* (2013.01); *B32B 2255/26* (2013.01); *B32B 2307/712* (2013.01); *C09J 2461/00* (2013.01); *C09J 2463/00* (2013.01); *C09J 2467/003* (2013.01); *C09J 2477/00* (2013.01); *C09J 2477/003* (2013.01); *Y10T 428/31522* (2015.04); *Y10T 428/31529* (2015.04)

(58) Field of Classification Search
CPC combination set(s) only.
See application file for complete search history.

(56) References Cited

U.S. PATENT DOCUMENTS

| | | | |
|---|---|---|---|
| 3,371,008 A | 2/1968 | Lopez | |
| 3,444,265 A | 5/1969 | Berardinelli | |
| 3,449,280 A * | 6/1969 | Frigstad | ................. C09J 177/02 |
| | | | 523/402 |
| RE27,426 E | 7/1972 | Lincoln et al. | |
| 3,912,566 A | 10/1975 | Andrews et al. | |

(Continued)

FOREIGN PATENT DOCUMENTS

| | | |
|---|---|---|
| CN | 1812881 A | 8/2006 |
| CN | 101003635 A | 7/2007 |

(Continued)

OTHER PUBLICATIONS

International Search Report dated Apr. 14, 2014 in PCT/EP2014/051695.

*Primary Examiner* — Nicole M. Buie-Hatcher
(74) *Attorney, Agent, or Firm* — Oblon, McClelland, Maier & Neustadt, L.L.P.

(57) ABSTRACT

The invention provides an adhesion promoter composition comprising at least one polymer A selected from at least one epoxy resin-phenol resin precondensate, a mixture of at least one epoxy resin-phenol resin precondensate and epoxy resins, a mixture of epoxy resins and phenol resins, polyamide resins and mixtures thereof, and at least one copolyamide-based hotmelt adhesive. Additionally described is a primer composition comprising at least one polymer B selected from saturated polyester resins, epoxy-phenol resin precondensates, mixtures of epoxy resins and phenol resins, and mixtures thereof, at least one crosslinker resin selected from the group consisting of melamine resins, blocked isocyanate resins and mixtures thereof, at least one catalyst, and at least one copolyamide-based hotmelt adhesive.

6 Claims, No Drawings

(56) References Cited

U.S. PATENT DOCUMENTS

| | | | |
|---|---|---|---|
| 4,035,436 A | 7/1977 | Matsubara et al. | |
| 4,173,290 A | 11/1979 | Kobayashi et al. | |
| 4,482,604 A | 11/1984 | Donermeyer et al. | |
| 4,555,533 A * | 11/1985 | Ambros | C08G 18/10 523/440 |
| 4,845,162 A | 7/1989 | Schmitt et al. | |
| 5,342,873 A * | 8/1994 | Merz | C08L 75/04 524/425 |
| 5,510,432 A | 4/1996 | Schmalstieg et al. | |
| 9,205,630 B2 | 12/2015 | Pawlik et al. | |
| 10,273,390 B2 * | 4/2019 | Henkenjohann | C09J 163/00 |
| 2006/0269701 A1 | 11/2006 | Gauriat et al. | |
| 2007/0102804 A1 | 5/2007 | Nakamura et al. | |
| 2011/0159307 A1 | 6/2011 | Husemann et al. | |
| 2012/0183787 A1 * | 7/2012 | Nagelsdiek | C09D 163/00 428/429 |

FOREIGN PATENT DOCUMENTS

| | | |
|---|---|---|
| CN | 102089363 A | 6/2011 |
| DE | 25 50 803 A1 | 5/1976 |
| DE | 10 2008 046 871 A1 | 3/2010 |
| EP | 1 504 892 A1 | 2/2005 |
| GB | 921423 A | 3/1963 |
| GB | 1 266 688 A | 3/1972 |
| GB | 1409015 | 10/1975 |
| JP | 55-71772 A | 5/1980 |
| JP | 8-85780 A | 4/1996 |
| JP | 2010-1367 A | 1/2010 |
| JP | 4669196 B2 | 4/2011 |
| JP | 2013-1760 A | 1/2013 |
| KR | 10-2007-0102827 A | 10/2007 |
| KR | 10-2011-0028550 A | 3/2011 |
| WO | WO 2010/136241 | 12/2010 |

* cited by examiner

ADHESION PROMOTER COMPOSITIONS AND PRIMER COMPOSITIONS FOR METAL-PLASTIC HYBRID COMPONENTS

CROSS-REFERENCE TO RELATED APPLICATIONS

This application is a divisional application of U.S. application Ser. No. 14/764,408, filed on Jul. 29, 2015, which is a national stage entry application of PCT/EP2014/051695, filed on Jan. 29, 2014, the text of which is incorporated by reference, and claims the benefit of priority from German Patent Application No. 10 2013 201 392.2, filed on Jan. 29, 2013, the entire contents of which are incorporated herein by reference.

The present invention relates to an adhesion promoter composition and a primer composition and to the use thereof, to a coating and the use thereof, to hybrid components, to processes for production thereof and to a metal substrate.

Metal-plastic hybrid components (or structural components) are composites of two materials: metal and plastic. They can be obtained by the injection moulding process.

Hybrid components are components used inter alia in vehicle construction and in aircraft construction and also in electronics and electrical engineering in the field of load-bearing parts and of parts that absorb forces, or as part of a housing, for example for decorative purposes. Hybrid components are usually components for which aesthetic requirements are minimal, which are used in motor vehicle construction and aircraft construction within the area of load-bearing parts and force-absorbing parts. A particular feature of these is that they comprise reinforcement systems which, locally or over the full area, give the component particular mechanical properties. A feature of particular significance, for example, is the increase in torsional stiffness or flexural stiffness on additional reduction in weight, as compared with components used to date.

The motor vehicle and aircraft construction sectors increasingly use hybrid components in order to reduce mass and at the same time obtain optimized mechanical properties. The disadvantage of these hybrid components is lack of, or inadequate, adhesion between metal and plastic. Mechanical methods have therefore hitherto been used to anchor the plastic to the metal.

Adhesion between metal and plastic can be improved by using adhesion promoters. EP-A-1808468 and EP-A-2435246 disclose hybrid components where the bond between metal and plastic uses hotmelt adhesives in the form of copolyamide-based adhesion promoters additionally comprising isocyanate groups and epoxy groups.

Coating of the metals by means of coil coating is desirable, in order to provide a way of rapidly providing hybrid components in a manner suitable for mass production, for example for the automotive sector. For this purpose, suitable viscosities, reproducible layer thicknesses and stoving conditions are necessary prerequisites. However, the prior art to date does not disclose any adhesion promoters suitable for this purpose.

The problem addressed was consequently that of providing a novel adhesion promoter which does not have the disadvantages of the prior art. Accordingly, the novel adhesion promoter was to be applicable continuously, in order to be suitable for the coil coating. In addition, the adhesion promoter was to meet the requirements of motor vehicle and aircraft construction, and the standard requirements such as prolonged and high adhesion were at least to be maintained compared to the prior art. In addition, there was to be good weathering stability, especially corrosion protection. Metal and plastic in the hybrid component were to be cohesively bonded to one another.

Accordingly, adhesion promoter compositions according to the claims have been found. Advantageous embodiments are apparent from the dependent claims.

The inventive adhesion promoter composition comprises at least one polymer A selected from an epoxy resin-phenol resin precondensate, a mixture of epoxy resins and phenol resins, polyamide resins and mixtures thereof, and at least one copolyamide-based hotmelt adhesive. The hotmelt adhesive preferably additionally comprises blocked polyisocyanates and an epoxy component. Polymer A is preferably present in the mass ratio relative to the hotmelt adhesive of 1:0.4 to 1:10.

In a preferred embodiment of the invention, the inventive adhesion promoter composition comprises
  a. 5%-25% by weight, preferably 10%-20% by weight, of at least one polymer A,
  b. 5%-50% by weight, preferably 10%-40% by weight, more preferably 20%-40% by weight, of at least one copolyamide-based hotmelt adhesive, and
  c. 30% to 80% by weight, preferably 40% to 70% by weight, of at least one organic solvent, based in each case on the total weight of the composition, where the percentages of all the constituents add up to 100% by weight.

In a preferred embodiment, polymer A is selected from at least one epoxy resin-phenol resin precondensate, a mixture of at least one epoxy resin-phenol resin precondensate and epoxy resins, a mixture of epoxy resins and phenol resins or mixtures thereof, particular preference being given to the epoxy-phenol resin precondensate or the mixture of at least one epoxy resin-phenol resin precondensate and epoxy resins.

Advantageously, the adhesion promoter composition comprises at least one epoxy resin. The latter may be introduced into the composition, for example, via the hotmelt adhesive or via polymer A.

The adhesion promoter composition may further comprise at least one crosslinker resin selected from the group consisting of melamine resins, blocked isocyanate resins or mixtures thereof. The crosslinker resin is preferably present in a proportion of 1.5% to 15% by weight, preferably 2% to 10% by weight.

The adhesion promoter composition may be present as a solution or as a dispersion. It is preferable that the hotmelt adhesive has been dispersed in polymer A.

The inventive adhesion promoter composition may comprise electrically conductive substances selected from graphite, carbon black, zinc dust and mixtures of these substances, thus giving electrically conductive adhesion promoter compositions.

The invention further provides a primer composition comprising at least one polymer B, at least one crosslinker resin, at least one catalyst and at least one hotmelt adhesive as already specified above. The hotmelt adhesive may comprise blocked polyisocyanates and an epoxy component. Preferably, the hotmelt adhesive in the primer composition contains less than 5% by weight of blocked polyisocyanates and epoxide, more preferably less than 2% by weight of blocked polyisocyanates and epoxide and especially preferably less than 1% by weight of blocked polyisocyanates and epoxide, based in each case on the total weight of the hotmelt adhesive. Most preferably, no blocked polyisocyanate and epoxide are present.

Polymer B is selected from the group of the saturated polyester resins, epoxy resin-phenol resin precondensates, mixtures of epoxy-phenol resin precondensate and epoxy resins, mixtures of epoxy resins and phenol resins, as already described above, and mixtures thereof, preference being given to saturated polyester resins.

The primer composition preferably comprises
a. 8%-23% by weight, preferably 12%-20% by weight, of at least one polymer B,
b. 1.5%-15% by weight, preferably 3%-9% by weight, of at least one crosslinker resin selected from the group consisting of melamine resins, blocked isocyanate resins and mixtures thereof,
c. 10%-40% by weight of at least one copolyamide-based hotmelt adhesive and
d. 30%-80% by weight, preferably 40%-70% by weight, of at least one organic solvent, based in each case on the total weight of the primer, where the percentages of all the constituents add up to 100% by weight.

The primer composition may further comprise at least one catalyst, preferably in a proportion of 0.5%-4% by weight, based on the total weight of the primer. The selection of the suitable catalyst depending on the crosslinker resin is known to those skilled in the art.

When melamine resins are used as crosslinker resin, the catalyst chosen is preferably a nonionic blocked acid catalyst. It is preferable here to use 0.5% to 3% by weight, more preferably 0.7% to 2.2% by weight, of the catalyst.

For systems comprising isocyanate resin as crosslinker resin, preference is given to using an organometallic compound as catalyst. Preference is given to using 0.7% to 2.5% by weight of this catalyst.

Inventive compositions are accordingly adhesion promoter compositions and primer compositions.

The inventive compositions may further comprise hardeners such as dicyandiamide (DCD), preferably in proportions of 3% to 6% by weight, based on the total weight of epoxy resin. To accelerate curing, urea derivatives such as monuron or fenuron can be added, and it is thus possible to lower the curing temperatures and/or shorten the curing times.

The invention further provides a coating comprising at least one layer of the inventive adhesion promoter composition. For this purpose, the adhesion promoter composition is applied to the metal, in which case the application may be preceded by cleaning of the metal and/or pretreatment thereof with a conversion layer. Metal cleaning and conversion layer compositions are known to those skilled in the art. The at least one inventive adhesion promoter composition may have been applied to a prior art primer composition.

The invention further provides a coating comprising at least one layer of the inventive primer composition. For this purpose, the primer composition is applied to the metal, in which case the application may be preceded by cleaning of the metal and/or pretreatment thereof with a conversion layer.

Preferably, the coating comprising at least one layer of the inventive primer composition further comprises at least one layer of an adhesion promoter, preference being given to at least one layer of the inventive adhesion promoter composition. The adhesion promoter layer is disposed atop, i.e. is applied to, the primer layer (in the sequence of metal—optionally conversion layer—primer layer—adhesion promoter layer). One of the effects of the conversion layer, which is generally obtained by means of phosphation or chromation, is homogeneous and improved adhesion of the coatings applied thereto. Suitable conversion agents are known to those skilled in the art.

The hybrid components comprising coatings of electrically conductive primer and/or adhesion promoter compositions can be provided with a cathodic electrocoat (CEC).

Coatings comprising the inventive adhesion promoter compositions or coatings comprising the primer compositions are defined as inventive coatings.

The invention further provides for the use of the inventive coatings as adhesion promoter between metal and plastic in a hybrid component.

The invention further provides hybrid components comprising metal and plastic, wherein the metal has been bonded to the plastic at least by an inventive coating.

In a process for producing the hybrid component, at least one layer of the inventive adhesion promoter composition is applied to the metal over the full area or partially. The adhesion promoter composition is subsequently thermally crosslinked. The crosslinking can be effected at object temperature 120° C. to 250° C. for a period of 1 to 30 min. The person skilled in the art can determine suitable time/temperature conditions via preliminary tests.

Typical peak metal temperatures (PMTs) established in coil coating operations are from 180° C. to 250° C., preferably 190° C. to 220° C. The person skilled in the art will set the system or belt speed accordingly so as to achieve the PMT.

The plastic is then applied to the metal, for example by means of an injection moulding process or by hot pressing, and the metal is physically and/or chemically bonded to the plastic. The combination of metal and plastic can then be subjected to a heat treatment (heat conditioning) at 120° C. to 150° C., preferably 150° C. to 230° C., for 5 min to 70 min, preferably 10 min to 60 min, in order to increase bond strength and degree of crosslinking. A coherent bond between the plastic and the metal is thus achieved. Hybrid components obtained in this way have durable bonding between the precoated metal and the plastic, and exhibit high mechanical and dynamic strength. The process is also provided by the invention.

In a further process according to the invention for producing the hybrid component, at least one layer of an inventive primer composition is applied to the metal over the full area or partially. First of all, the primer composition is applied and crosslinked, the crosslinking being effected at object temperature 120° C. to 250° C. for a period of 1 to 30 min. The person skilled in the art can determine suitable time/temperature conditions via preliminary tests.

Typical peak metal temperatures established in coil coating operations are from 190° C. to 250° C., preferably 200° C. to 230° C. The person skilled in the art will set the system or belt speed accordingly so as to achieve the PMT.

In a preferred process for producing the hybrid component, at least one layer of an inventive primer composition and then at least one layer of an adhesion promoter composition are applied to the metal, each over the full area or partially. The composition is preferably an inventive adhesion promoter composition. First of all, the primer composition is applied and crosslinked, and this may be heated to the peak metal temperatures of 190° C. to 250° C., preferably 200° C. to 230° C., as are typical of crosslinking in coil coating operations. Thereafter, the adhesion promoter composition is applied and crosslinked thermally, advantageously with peak metal temperatures of 180° C. to 250° C., preferably 190° C. to 230° C., as are typical in coil coating operations. If the application is not undertaken by means of coil coating, the crosslinking can be effected at object temperature 150° C. to 200° C. for a period of 5 to 30 min.

Thereafter, in the aforementioned processes, the plastic is then applied to the metal, for example by means of an injection moulding process or by hot pressing, and the metal is physically and/or chemically bonded to the plastic. The combination of metal and plastic can then be subjected to a heat treatment (heat conditioning) at 120° C. to 230° C., preferably 150° C. to 230° C., for 5 min to 70 min, preferably 10 min to 60 min, in order to increase bond strength and degree of crosslinking. A coherent bond between the plastic and the metal is thus achieved. Hybrid components obtained in this way have durable bonding between the precoated metal and the plastic, and exhibit high mechanical and dynamic strength. The process is also provided by the invention.

The composition can be applied continuously or discontinuously in the processes according to the invention. The compositions are advantageously cured thermally.

The inventive compositions can be applied continuously or discontinuously by means of electrophoretic enamelling, rolling, casting, jetting and spraying, preference being given to roll application by the coil coating method. The compositions of the invention here can be applied on one or both sides. The wet film thicknesses of the adhesion promoter compositions may be 20 μm to 250 μm, for coil coating preferably 40 μm to 120 μm, and the wet film thicknesses for primer compositions may be 10 μm to 90 μm, for coil coating preferably 10 μm to 40 μm, and for other application methods preferably 30 μm to 90 μm.

Examples of suitable metals are iron-containing alloys such as steel, aluminium, magnesium, titanium, and also alloys of the abovementioned metals. Preferred metals are steel, titanium, aluminium, and also alloys of the abovementioned metals, particular preference being given to steel and aluminium, and aluminium alloys.

Preferred steels are unalloyed steels and stainless steels. Steels with a protective coating are particularly preferred. Suitable coatings are by way of example coatings made of zinc, aluminium-silicon, aluminium-zinc, zinc-aluminium, zinc-iron or zinc-magnesium, preference being given here to aluminium-silicon, zinc-aluminium and zinc, particular preference to zinc. The composition of the coatings is defined by way of example in the brochure "Schmelztauchveredeltes Band and Blech" [Hot-dip-coated Strip and Sheet] from the Steel Information Centre in the Stahl-Zentrum, Düsseldorf, Germany, 2010 Edition.

Before the application of the plastic, the coated metal can be subjected to a shaping or forming process. The shaping or forming process may precede or follow the application of the aforementioned compositions.

The plastic can be applied to the coated metal in a known manner, e.g. by injection moulding, compression, lamination, in-mould coating or (co)extrusion. Injection moulding technology is preferably used to inject the plastic. For this purpose, the coated metal part is inserted into the injection mould and, after closing of the mould, is coated in the mould with the plastic. Contact of the plastics melt with the coated metal surface produces a cohesive bond and adhesion between the components. The cohesively bonded hybrid component can then be demoulded from the injection mould and subjected to further processing or further mechanical operations.

The metal provided with the inventive coatings may have been subjected to preconditioning in the range from 50° C. to 250° C. in order to raise the temperature in the region of contact with the plastic, for example in the case of in-mould coating or in the case of (co)extrusion, for good bonding between the adhesion promoter and the plastic.

Suitable plastics are, for example, polyolefin homo- and copolymers based, for example, on polypropylene, polyoxymethylenes, polybutylene terephthalates, polycarbonates, aliphatic or semiaromatic polyamides, mixtures of polyamide and polystyrene, acrylonitrile-butadiene-styrene copolymers or further polyamide-containing polymers. Mixtures of polycarbonates and acrylonitrile-butadiene-styrene are likewise suitable. Aliphatic or semiaromatic polyamides are preferred. Particular preference is given to aliphatic polyamides.

The plastics may have been reinforced (reinforcers), for example fibre-reinforced, preference being given to glass fibre- (GF) or carbon fibre-reinforced (CF) plastics. The plastics may additionally comprise fillers such as talc powder or chalk. The plastics may further comprise additives, for example stabilizers, impact modifiers, flow aids and pigments.

Preferred polyamides (PA) are selected from the group consisting of nylon-6, nylon-6,6, nylon-6,10, nylon-6,12, nylon-6,13, nylon-6,14, nylon-10,6, nylon-10,10, nylon-10,12, nylon-12,12, nylon-11, nylon-12, polyphthalamides and mixtures based on these polyamides. Particularly preferred polyamides are selected from nylon-6, nylon-6,6, and mixtures of these. The polyamides can comprise reinforcing materials, fillers or mixtures of these substances.

The inventive hybrid components are used by way of example in mechanical engineering and plant engineering, vehicle construction, the airline industry, in railway engineering and the like. A typical use is in the field of load-bearing structures, for example front ends (shock absorbers) or further chassis and bodywork parts, as bodywork and chassis parts such as front-end bearings, door components, roof components, floor components or underbody components, or shock absorbers. Equally suitable application sectors are frames, profiles, façade elements or guide strips for windows and doors in the field of house construction and architecture.

The invention further provides a metal substrate coated with at least one inventive adhesion promoter composition, with at least one inventive primer composition or with a mixture of the two. The substrate can by way of example be a semifinished metallic product or a metallic moulding. Preferably, the substrate is a metal tape or a metal wire.

Polymer A

Polymer A is selected from at least one epoxy resin-phenol resin precondensate, a mixture of at least one epoxy resin-phenol resin precondensate and epoxy resins, a mixture of epoxy resins and phenol resins, polyamide resins and mixtures thereof.

Epoxy resin and phenol resin A suitable polymer A is a mixture of epoxy resin and phenol resin. In addition, the resins may have reacted with one another, and so it is possible to use a precondensate containing at least one epoxy resin and at least one phenol resin. Precondensates of this kind are described, for example, in D. Stoye, W. Freitag: Lackharze [Coating Resins], Carl Hanser Verlag Munich 1996, ISBN 978-3446174757, chapter 6.3.8.2.2.

Preferably, the molar ratio of epoxy groups in the epoxy resin to hydroxyl groups in the phenol resin is 40:60 to 15:85, preferably 50:50 to 80:20. In the case of an excess of hydroxyl groups in the phenol resin, the epoxy resin-phenol resin precondensate is preferably mixed with further epoxy resin.

The epoxy equivalent weight of the epoxy resins used may be between 400 and 4000 g/mol, preferably 700 and 3000 g/mol (determined in accordance with SMS 2026).

The content of OH groups in suitable epoxy resins is preferably 2000 to 4500 mmol/kg, more preferably 2300 to 4000 mmol/kg (method of SMS 2367).

Epoxy resins used may, for example, be compounds based on diols or on polyols or dicarboxylic acids, preference being given here to diols and particular preference to corresponding phenol-diol derivatives. Very particularly preferred phenol-diol derivatives are bisphenols, in particular bisphenol A. The epoxy resin is usually obtained by reaction with epichlorohydrin.

The density of suitable epoxy resins is from 1 to 1.3 kg/l (25° C.; determined in accordance with ASTM D792). The glass transition temperature (Tg) may be 20° C. to 100° C., preferably 25° C. to 90° C. (determined in accordance with ASTM D3418). The melting range is usually in the range from 45° C. to 150° C. (in accordance with DIN 53181). Suitable epoxy resins are obtainable by way of example as EPIKOTE resin, for example EPIKOTE Resin 1001 or 1009 from Hexion Specialty Chemicals, Inc.

The phenol resin may be partly alkylated, preferably methylated, ethylated or butylated, preferably butylated. The viscosity may be 340 to 390 mPa·s at 23° C. (in accordance with method 02-AR). The Gardner colour number may be in the range from 0 to 4. The solids content is typically 40% to 70% by weight, preferably 55% to 60% by weight (in accordance with method 01-DK). The density may be 0.9 to 1.1 kg/l (23° C.). Suitable phenol resins are available, for example, under the following names: Bakelite resin (Bakelite AG), hardener (Ciba-Geigy), Ilmtalor (Ilmtal Kunstharz Beier) or Santolink (Monsanto).

A precondensate may be obtained from the reaction of the epoxy resin with the phenol resin. This precondensate may have a viscosity of 1500 to 2100 mPa·s, a Gardner colour number of 4, a solids content of 30% to 60% by weight, preferably 40% to 50% by weight, based on the total weight of the precondensate, and a density of 0.9 to 1.1 kg/l (23° C.).

Polyamide Resin

Suitable polyamide resins are, for example, polyamide imide resins. The polyamide resins may be present in organic solvents, preference being given to N-methylpyrrolidone, N-ethylpyrrolidone or mixtures of N-methylpyrrolidone and N-ethylpyrrolidone. Said solvents may be blended with xylene.

The polyamide imide resin solutions have a solids content of 30% to 50% by weight, preferably of 35% to 45% by weight (determination to DIN EN ISO 3251), a viscosity at 23° C. of 1500 to 3500 mPa·s (determination to DIN EN ISO 3219/A.3). The density may be between 1 and 1.25 g/cm$^3$ (determination to DIN 51757).

Hotmelt Adhesive

The hotmelt adhesive comprises at least one copolyamide. The copolyamide can be produced from amide monomers and from comonomers. The comonomers are preferably used to obtain copolyamides with a melting point from 95° C. to 175° C.

The amide monomers are preferably selected from the group consisting of laurolactam, aminoundecanoic acid and mixtures thereof. Particular preference is given to copolyamides based on laurolactam.

The comonomers are preferably selected from aliphatic or cycloaliphatic diamines, aliphatic or cycloaliphatic dicarboxylic acids, lactams and mixtures thereof. The comonomers preferably comprise, mutually independently, from 4 to 18 C atoms. Suitable dicarboxylic acids are by way of example adipic acid, sebacic acid and dodecanedioic acid. Suitable diamines are by way of example hexamethylenediamine, decamethylenediamine and dodecamethylenediamine. Lactams such as caprolactam can likewise be used as comonomer.

Preferred comonomers are caprolactam and a polymer made with adipic acid and hexamethylenediamine, preferably in a ratio by mass of 1:1.

An excess of amine groups in the diamines gives copolyamides having reactive amino end groups.

The amine numbers of the copolyamides are preferably from 75 to 400 mmol/kg.

The weight-average molar mass of the copolyamides is preferably in the range from 15 000 to 70 000 g/mol (determined by means of gel permeation chromatography against polystyrene standard). The relative solution viscosity is preferably from 1.2 to 1.8 (determined in accordance with ISO 307).

The copolyamides and the hotmelt adhesive can be used in the inventive compositions in solution, in dispersion or in powder form, preference being given here to the powder form. A suitable solvent is by way of example m-cresol.

The powder form can by way of example be obtained by milling, the grain diameter here with preference being <100 μm, more preferably <80 μm and with particular preference <70 μm (sieve analysis).

Further constituents of the hotmelt adhesive added to the copolyamide may be at least one epoxy component and at least one blocked polyisocyanate.

Epoxy components used may be the aforementioned epoxy resins. The preferred epoxy component typically has an epoxy index of 1-2 eq/kg. The epoxy equivalent weight is preferably from 875 to 1000 g/mol. The density can be from 1.1 to 1.3 kg/l, preferably from 1.15 to 1.25 kg/l. The glass transition temperature is usually in the range from 40 to 60° C., preferably from 45 to 55° C. The hotmelt adhesive preferably comprises a proportion of from 2.5% to 10% by weight of the epoxy component, more preferably from 4% to 6% by weight, based in each case on the total weight of the hotmelt adhesive.

The proportion of blocked polyisocyanate is preferably from 2.5% to 15% by weight, more preferably from 4% to 6% by weight, based in each case on the total weight of the hotmelt adhesive.

The blocked polyisocyanate component can be aromatic, aliphatic or cycloaliphatic, preference being given here to aliphatic or cycloaliphatic polyisocyanates. Blocking agents for isocyanates such as oximes, phenols or caprolactam are known to the person skilled in the art. It is preferable that, for blocking purposes, the polyisocyanate component takes the form of uretdione. Typical examples are marketed as VESTAGON by Evonik Industries, Germany, or Desmodur from Bayer, Germany.

Suitable hotmelt adhesives are available by way of example as VESTAMELT from Evonik Industries AG, Germany. Examples that may be mentioned are X1027-P1, X1038-P1, X1316 P1 and X1333-P1.

Other materials that can be present alongside the hotmelt adhesive are graft copolymers made of polyamine and of polyamide-forming monomers such as lactams and/or co-aminocarboxylic acids, as described in EP1065236A2:

The concentration of amino groups in the graft copolymer is preferably in the range from 100 to 2500 mmol/kg.

Examples of substance classes that can be used as polyamine are the following:

polyvinylamines (Römpp Chemie Lexikon, [Römpp's Chemical Encyclopaedia] 9th Edn. Vol. 6, p. 4921, Georg Thieme Verlag Stuttgart 1992);

polyamines that are produced from alternating polyketones (DE-A 196 54 058);

dendrimers, for example $((H_2N—(CH_2)_3)_2N—(CH_2)_3)_2—N(CH_2)_2—N((CH_2)_2—N((CH_2)_3—NH_2)_2)_2$ (DE-A-196 54 179) or tris(2-aminoethyl) amine, N,N-bis(2-aminoethyl)-N',N'-bis[2-[bis(2-aminoethyl)amino]ethyl]-1,2-ethanediamine, 3,15-bis(2-aminoethyl)-6,12-bis[2-[bis(2-aminoethyl)amino] ethyl]-9-[2-[bis[2-bis(2-aminoethyl)amino]ethyl] amino]ethyl]-3,6,9,12,15-pentaazaheptadecane-1,17-diamine (J. M. Warakomski, Chem. Mat. 1992, 4, 1000-1004);

linear polyethyleneimines which can be produced by polymerization of 4,5-dihydro-1,3-oxazoles followed by hydrolysis (Houben-Weyl, Methoden der Organischen Chemie [Methods of Organic Chemistry]), vol. E20, pp. 1482-1487, Georg Thieme Verlag Stuttgart, 1987);

branched polyethyleneimines which are obtainable by polymerization of aziridines (Houben-Weyl, Methoden der Organischen Chemie, vol. E20, pp. 1482-1487, Georg Thieme Verlag Stuttgart, 1987) and which generally have the following amino group distribution:

from 25 to 46% of primary amino groups,
from 30 to 45% of secondary amino groups and
from 16 to 40% of tertiary amino groups.

In the preferred case the number-average molar mass $M_n$ of the polyamine is at most 20 000 g/mol, more preferably at most 10 000 g/mol and especially preferably at most 5000 g/mol.

Lactams and ω-aminocarboxylic acids which can be used as polyamide-forming monomers comprise from 4 to 19 carbon atoms, in particular from 6 to 12. It is particularly preferable to use ε-caprolactam and laurolactam or the relevant co-aminocarboxylic acids. The molar ratio of C12 to C6 unit is preferably from 4:1 to 1:4. The ratio by mass of hotmelt adhesive to graft copolymer is preferably from 19:1 to 1:1.

In the simplest case, the functionalized polyolefin is polypropylene-based. However, ethylene/$C_3$-$C_{12}$-α-olefin copolymers are also suitable. An example of a $C_3$-$C_{12}$-α-olefin used is propene, 1-butene, 1-pentene, 1-hexene, 1-octene, 1-decene or 1-dodecene. The ethylene/$C_3$-$C_{12}$-α-olefin copolymers can moreover also comprise up to at most about 10% by weight of olefin dienes such as ethylidenenorbornene or 1,4-hexadiene. Functionalization is preferably provided by acid anhydride groups, these being introduced in a known manner through thermal or free-radical reactions of the main-chain polymer with an unsaturated dicarboxylic anhydride or with an unsaturated dicarboxylic acid. Examples of suitable reagents are maleic anhydride and itaconic anhydride. The quantity grafted onto the material in this method is from 0.1 to 4% by weight, based on the total weight of the functionalized polyolefins, and another monomer such as styrene can also be used here.

Maleic acid-grafted polyolefins are widely used for industrial applications, in particular for impact modifications or as compatibilizers in blends and mechanically reinforced systems (Polymer, 2001, 42, 3649-3655 and literature cited). The source mentioned also describes by way of example the production of functionalized polyolefins of this type.

A typical representative of a functionalized polyolefin is the polypropylene-based, acid anhydride-grafted material Admer QB 520 E (Mitsui Chemicals). It is also possible in principle to use maleic acid-grafted polypropylenes from Kometra (e.g. SCONA TPPP 8012), these being more free-flowing.

Another possible functionalization method consists in the mixing, in the melt, of unfunctionalized polyolefins with reactive compatibilizers which comprise epoxy or carboxylic anhydride groups. Typical examples are copolymers composed of ethylene and of one or more unreactive acrylic monomers with maleic anhydride or glycidyl methacrylate. Lotader AX8900 (Arkema) is a typical representative material having glycidyl methacrylate units.

The ratio of polyamide component to polyolefin component is from 9:1 to 2:3.

Organic Solvents

Suitable solvents are polar or nonpolar organic solvents. Mixtures of polar and nonpolar solvents may likewise be used. Preferred solvents are ketones, glycols, Solvent Naphtha, n-alkanes or isoalkanes, the alkanes especially comprising 12 to 20 carbon atoms.

Polymer B

Polymer B is selected from the group of the saturated polyester resins, epoxy resin-phenol resin precondensates, mixtures of epoxy-phenol resin precondensate and epoxy resins, mixtures of epoxy resins and phenol resins, as already described above, and mixtures thereof, preference being given to saturated polyester resins.

Polyester Resin

The polyester resin is preferably a copolymer of aromatic dicarboxylic acids and aliphatic diols. In this way, linear copolyesters of high molecular weight are obtained. The number-average molecular weight is preferably in the range from 10 000 to 20 000 g/mol. Preference is given to a number-average molecular weight between 14 000 and 16 000 g/mol (GPC against polystyrene standard).

Characteristic parameters are a density of 1.2 to 1.3 kg/l, a glass transition temperature of 40 to 105° C., preferably 60° C. to 80° C., and a softening temperature of 140 to 150° C. The hydroxyl number of the polyester resin is preferably less than 10 mg KOH/g, preferably 5 to 10 mg KOH/g (determination to DIN 53240). The acid number ranges preferably from 0 to 3 mg KOH/g (DIN 53402).

Epoxy Resin

The epoxy resin for polymer B corresponds to the definition of the epoxy resin for polymer A. The epoxy resin for polymer B, in an inventive coating, may be the same as or different from the epoxy resin for polymer A.

Crosslinker Resin

The crosslinker resin is selected from the group consisting of melamine resins, blocked isocyanate resins and mixtures thereof. Melamine resins are preferred, particular preference being given to melamine-formaldehyde resins. Most preferably, the melamine-formaldehyde resins have been etherified with alkyl groups such as methyl groups. More particularly, hexamethoxymethylmelamine (HMMM) is used.

The blocked isocyanate resins have preferably been blocked with phenols, oximes, c-caprolactam, malonic esters, acetoacetic esters, alcohols or secondary amines, preferably oximes. Suitable isocyanates are aliphatic polyisocyanates such as hexamethylene diisocyanate, for example Desmodur BL 3175 from Bayer, Germany. The reaction of the polyesters with isocyanate resins gives rise to polyurethanes.

The blocked isocyanate resin may be mixed with the hotmelt adhesive or be added separately from the compositions.

Catalyst

The catalyst is typically added as a 1% to 20% solution, as supplied commercially.

a) Acid Catalyst

For the crosslinking of the polyesters with melamine resins, preference is given to using nonionic blocked catalysts. Preference is given to using epoxy-blocked acids based on DNNSS (dinonylnaphthalenemonosulphonic acid) and Versatic acid, particular preference being given to blocked Versatic acids. The catalyst typically has a solids content of 40%-60% by weight, preferably 45%-55% by weight.

b) Organometallic Catalysts

For the crosslinking of the polyesters, the epoxy resin-phenol resin precondensates and the mixtures of epoxy resins and phenol resins with blocked isocyanate resins, it is possible to use organometallic compounds. Preference is given to using organotin compounds. Particular preference is given to catalysts based on DBTL (dibutyltin dilaurate).

Further Ingredients

The inventive compositions may further comprise colorants, preferably pigments. In addition, functional pigments such as anticorrosion pigments or electrically conductive pigments such as metal pigments, levelling agents, fillers or elastifying resins may be present.

Even in the absence of further information it is assumed that a person skilled in the art can make very extensive use of the above description. The preferred embodiments and examples are therefore to be interpreted merely as descriptive disclosure, and certainly not as disclosure that is in any way limiting.

The present invention is explained in more detail below with reference to examples. Alternative embodiments of the present invention are obtainable analogously.

EXAMPLES

The adhesion of plastic to metal in hybrid components was examined. For this purpose, different metals and plastics were used. Prior to application of primer and adhesion promoter compositions, the metals were cleaned and provided with a chromation V2 as conversion layer V.

A temperature check was made by means of temperature measurement strips which indicate the temperature attained through a colour change (black).

The temperature conditions are: 30 min at 190° C.

To assess the adhesion, tensile shear tests were conducted.

Materials Used:

Primer Compositions

Polymer B, pigments and fillers are adjusted to a mean grain diameter of less than 15 μm; the hotmelt adhesive is then added.

P1: Polyester resin (number-average molecular weight 15 000 g/mol), melamine resin, anticorrosion pigment, filler, colorant, acid catalyst, solvent and copolyamide hotmelt adhesive without epoxy component and blocked polyisocyanate P2: Epoxy resin-phenol resin precondensate, anticorrosion pigment, fillers, colorant, solvent and copolyamide hotmelt adhesive without epoxy component and blocked polyisocyanate P3: Polyester (number-average molecular weight 20 000 g/mol), polyisocyanate crosslinker, tin catalyst, solvent and copolyamide hotmelt adhesive without epoxy component and blocked polyisocyanate P4: Polyester mixture of 2 polyester resins (number-average molecular weights 15 000 and 20 000 g/mol) in combination with blocked isocyanate resin, tin catalysts, solvent and copolyamide hotmelt adhesive without epoxy component and blocked polyisocyanate P5: Polyester (number-average molecular weight 20 000 g/mol), polyisocyanate crosslinker, tin catalyst, solvent Adhesion Promoter Compositions L1: Epoxy resin-phenol resin mixture with copolyamide hotmelt adhesive with epoxy component and blocked polyisocyanate L2: Epoxy resin-phenol resin precondensate with copolyamide hotmelt adhesive with epoxy component and blocked polyisocyanate L3: Epoxy resin-phenol resin precondensate with copolyamide hotmelt adhesive without epoxy component and blocked polyisocyanate L4: Epoxy resin-phenol resin precondensate with copolyamide hotmelt adhesive with epoxy component and blocked polyisocyanate (the copolyamide hotmelt adhesive has a lower molar mass compared to the copolyamide hotmelt adhesive from L2)

Metal variants M1: DX56D Z140 MBO in 1.0 mm

M2: DX53D Z140 MBO in 0.6 mm

M4: AW-5754 AlMg3 H22 DIN EN 485-2

M5: CuZn37 to DIN EN 17670 T1

M6: Titanium-zinc to EN 988

Plastic Variants

K1: PA6GF30 Durethan BKV30 H2.0 from LANXESS Deutschland GmbH

K2. PA6.6 Durethan A30 S from LANXESS Deutschland GmbH

K3: PA1010 VESTAMID Terra DS18 from Evonik Industries AG

K4: PA1010GF65 VESTAMID Terra BS1429 from Evonik Industries AG

K5: PA1010CF30 VESTAMID HTplus TGP3561 from Evonik Industries AG

K6: PA6T VESTAMID HTplus M1000 from Evonik Industries AG

K7: PA6TGF50 VESTAMID HTplus M1035 from Evonik Industries AG

K8: PBTGF30 VESTODUR GF30 from Evonik Industries AG

K9: PC Makrolon 2205 from Bayer AG

K10: PA12CF Composite from Evonik. Fibre composite material sheets of thickness 1.0 mm, composed of VESTAMID L1600 (nylon-12) and of carbon fibre fabric having continuous fibres, were used. The fabric has a weight of about 285 g/m$^2$ with an orientation of 0°/90°. The fibre composite material sheets were produced in a pressing process.

A) Laboratory Studies by Means of Coating Bar Application

For this purpose, in the laboratory, variants of the primer were applied by means of spiral coating bars to sheets of DX56D Z140 MBO steel, thickness 1 mm (M1) in DIN A4 format with a conversion layer (phosphation) and then subjected to thermal crosslinking in a circulation dryer for 55 s. The peak metal temperature (PMT) was defined as being in the region of 216° C. or 232° C. The primer-coated DIN A4 sheets were cooled at room temperature.

| Primer | Oven temperature in ° C. | PMT in ° C. | DLT in μm | Coating bar no. |
|---|---|---|---|---|
| P2 | 345 | 216 | 11-13 | 22 |
| P1 | 345 | 216 | 15-17 | 20 |
| P3 | 355 | 232 | 12-16 | 22 |
| P4 | 355 | 232 | 12-16 | 24 |
| P5 | 355 | 232 | 14-16 | 24 |
| P5 | 355 | 232 | 14-16 | 24 |

DLT: dry layer thickness

Thereafter, the sheets were endowed with an adhesion promoter composition by means of spiral coating bar no. 42 and subjected to thermal crosslinking in a circulation dryer for 70 s (PMT=216° C.). The samples were subsequently cooled at room temperature. The dry layer thickness was 35 μm in each case.

The sheet specimens of thickness 1 mm which had been coated in this way were cut to a size of 50 mm×36 mm and coated with the plastic (thickness 2 mm) on one side in an injection mould with an Arburg 370 S injection moulding machine at a mould temperature of 110° C. and a melt temperature of 280° C. The total length of the specimens was 60 mm. The region of overlap between plastic and metal sheet is 18 mm×50 mm. The tensile shear samples were then tested on a universal tensile tester, based on ISO 527, with a test speed of 10 mm/min at 23° C. and 50% relatively air humidity, and the breaking stress of the samples was determined. For this purpose, the samples, after the in-mould coating, were either subjected to heat conditioning or were not, and the tensile shear strengths (bond strengths) of conditioned and unconditioned samples were compared.

| Primer | Adhesion promoter | Bond strength in MPa; unconditioned | Bond strength in MPa; conditioned | Remarks (conditioned) |
|---|---|---|---|---|
| P2 | L2 | 3.3 | 11.1 | plastic fractures |
| P1 | L2 | 3.8 | 11.5 | plastic fractures |
| P3 | L2 | 4.8 | 5.9 | |
| P4 | L2 | 3.6 | 11.1 | plastic fractures |
| P5 | L2 | 2.4 | 9.5 | plastic fractures |
| P5 | L3 | 5.5 | 10.8 | plastic fractures |

In the laboratory tests by means of a coating bar laboratory test, the coated and in-mould-coated hybrid composite samples with a conditioning step had increased bonding forces (breaking stresses) compared to the unconditioned samples.

In addition, adhesion to various metal alloys was examined analogously to the above experiments, except that the metal sheets were cut to size of about 25 mm×60 mm.

| Metal | Primer | Adhesion promoter | Mould temperature in ° C. | Bond strength in MPa unconditioned |
|---|---|---|---|---|
| M5 | none | none | 80° C. | n.a. |
| M5 | P1 | L4 | 80° C. | 0.7 |
| M6 | none | none | 80° C. | n.a. |
| M6 | P1 | L4 | 80° C. | 1.0 |
| M7 | none | none | 80° C. | n.a. |
| M7 | P1 | L4 | 80° C. | 1.7 |
| M8 | none | none | 80° C. | n.a. |
| M8 | P1 | L4 | 80° C. | 2.3 |
| M9 | none | none | 80° C. | n.a. |
| M9 | P1 | L4 | 80° C. | 3.4 | n.a.: no adhesion

B) Plant Experiment

The compositions were applied by means of roll application in a coil coating process in a corresponding coating plant and subsequent thermal crosslinking (thermal curing) of the coating layer applied in a flow oven. Before the actual application of coating material or primer, the metal surface was subjected to pretreatment (cleaning, production of a conversion layer V1—phosphation or V2—chromation). The metal used was a galvanized steel strip DX53D Z140 MBO (steel S2) of layer thickness 0.6 mm and a width of 390 mm. The dry layer thicknesses of the primer compositions were 9 to 13 μm, and those of the adhesion promoter compositions 18 to 28 μm. The peak metal temperature (PMT) was defined as a range of 216° C. to 224° C.

Steel sheet strips (about 25 mm×60 mm) were cut out of the sheets for the in-mould coating experiments. The coated steel sheet strips, after being inserted into an injection mould, were subjected to in-mould coating with plastics K1-K9, and these were used to produce tensile shear samples for adhesion tests.

The single-sided processing of the plastic was effected in an Arburg Allrounder 420 C injection moulding machine at a melt temperature of 280° C., a mould temperature of 80° C. and 120° C., and an injection rate of about 30 ccm/sec. It was important here to provide an injection delay of about 15 s, so that the metal sheet strip inserted could be preheated to mould temperature, giving a favourable effect on adhesion. The region of overlap between plastic and metal was 25 mm×25 mm. The thickness of the overmoulded plastic was 4 mm. After demoulding, the individual tensile shear test samples were separated from the sprue.

The test samples thus produced were stored at 50% relative humidity for at least 24 h at 23° C. in order to ensure a uniform state of conditioning. The test samples are then clamped into a standard Zwick/Roell Z-020 tensile tester and tested with a velocity of 5 mm/min at 23° C. with a distance between the clamps and the overlap region of about 25 mm/side.

The tensile shear strength measured (in MPa) is reported in table which follows for the coating composed of primer composition and adhesion promoter composition.

| Metal | V | Primer | Adhesion promoter | Plastic | Mould temperature in ° C. | Bond strength in MPa unconditioned | Bond strength in MPa conditioned |
|---|---|---|---|---|---|---|---|
| M1 | V1 | none | L1 | K1 | 80 | 1.9 | 7.2 |
| M1 | V1 | none | L1 | K1 | 120 | 6.2 | 7.4 |

-continued

| Metal | V | Primer | Adhesion promoter | Plastic | Mould temperature in ° C. | Bond strength in MPa unconditioned | Bond strength in MPa conditioned |
|---|---|---|---|---|---|---|---|
| M2 | V2 | P1 | L2 | K1 | 80 | 6.5 | 7.7 |
| M2 | V2 | P1 | L2 | K1 | 120 | 7.7 | 7.6 |
| M4 | V2 | P1 | L2 | K1 | 80 | 5.3 | 5.7 |
| M4 | V2 | P1 | L2 | K1 | 120 | 6.2 | 6.2 |
| M2 | V2 | none | none | K1 | 80 | n.a. | n.a. |
| M2 | V2 | none | none | K1 | 120 | n.a. | n.a. |
| M2 | V2 | P1 | L4 | K1 | 80 | 6.6 | 5.8 |
| M2 | V2 | P1 | L4 | K1 | 120 | 7.8 | 6.8 |
| M2 | V2 | none | none | K2 | 80 | n.a. | n.r. |
| M2 | V2 | P1 | L4 | K2 | 80 | 4.2 | n.r. |
| M2 | V2 | none | none | K3 | 80 | n.a. | n.r. |
| M2 | V2 | P1 | L4 | K3 | 80 | 0.7 | n.r. |
| M2 | V2 | none | none | K4 | 80 | n.a. | n.r. |
| M2 | V2 | P1 | L4 | K4 | 80 | 6.0 | n.r. |
| M2 | V2 | none | none | K5 | 80 | n.a. | n.r. |
| M2 | V2 | P1 | L4 | K5 | 80 | 6.5 | n.r. |
| M2 | V2 | none | none | K6 | 120 | n.a. | n.r. |
| M2 | V2 | P1 | L4 | K6 | 120 | material fractures | n.r. |
| M2 | V2 | none | none | K7 | 120 | n.a. | n.r. |
| M2 | V2 | P1 | L4 | K7 | 120 | 6.0 | n.r. |
| M2 | V2 | none | none | K8 | 80 | n.a. | n.r. |
| M2 | V2 | P1 | L4 | K8 | 80 | 2.6 | n.r. |
| M2 | V2 | none | none | K9 | 80 | n.a. | n.r. |
| M2 | V2 | P1 | L4 | K9 | 80 | 1.5 | n.r. | n.a.: no adhesion;
n.r.: no result

The coating composed of primer composition and adhesion promoter composition, in an advantageous manner, already achieves high values for adhesion here, especially with a high mould temperature (120° C.) without a subsequent heat conditioning operation on the samples after in-mould coating.

The subsequent conditioning increases the adhesion, especially in the case of the lower mould temperature of 80° C.

C) Pressing Experiment

The bond between plastic and coated metal was obtained by a pressing operation in a hydraulic hot press (manufacturer: Paul Weber, name: TEMPRESS). This is done by inserting the coated metal sheet having dimensions of about 60×25×0.6 mm into a template in one half of the hot press. An injection-moulded plastic sheet having dimensions of 60×25×4 mm is positioned thereon. The half of the press on the metal sheet side is heated to about 200° C.-230° C. Thereafter, the plastics component and the coated metal sheet are pressed at a pressure of about 32 bar with a hold time of about 5 min to give a composite body (tensile shear bar specimen) (overlap area 25 mm×25 mm).

The application of the adhesion promoter compositions and testing of bond strength were conducted analogously to the plant experiments.

| Metal | V | Primer | Adhesion promoter | Plastic | Mould temperature in ° C. | Bond strength in MPa unconditioned |
|---|---|---|---|---|---|---|
| M2 | V2 | none | none | K1 | 200° C. | n.a. |
| M2 | V2 | P1 | L4 | K1 | 200° C. | 2.8 |
| M2 | V2 | none | none | K7 | 230° C. | n.a. |
| M2 | V2 | P1 | L4 | K7 | 230° C. | 3.6 |
| M2 | V2 | none | none | K10 | 230° C. | n.a. |
| M2 | V2 | P1 | L4 | K10 | 230° C. | 6.0 | n.a.: no adhesion

The invention claimed is:

1. A primer composition comprising:
   (a) 8%-23% by weight of at least one polymer B selected from the group consisting of saturated polyester resins, epoxy-phenol resin precondensates, mixtures of epoxy resins and phenol resins, and mixtures thereof;
   (b) 1.5%-15% by weight of at least one crosslinker resin selected from the group consisting of melamine resins, blocked isocyanate resins and mixtures thereof;
   (c) 10%-40% by weight of at least one copolyamide-based hotmelt adhesive comprising a copolyamide, at least one block isocyanate, and at least one epoxy component; and
   (d) 30%-80% by weight of at least one organic solvent, based in each case on the total weight of the primer, where the percentages of all the constituents add up to 100% by weight,
   wherein the epoxy component of the hotmelt adhesive c) is different from the epoxy resins of the polymer B.

2. A coating comprising at least one layer of the primer composition according to claim 1.

3. A process for producing a hybrid component comprising metal and plastic, the process comprising:
   applying at least one layer of the primer composition according to claim 1 to the metal; then thermally crosslinking the primer composition; and then
applying the plastic to the coated metal and bonding the metal to the plastic.

4. The process according to claim 3, wherein at least one layer of an adhesion promoter composition is applied to the thermally crosslinked primer composition and the adhesion promoter composition is thermally crosslinked before the plastic is applied to the coated metal and the metal is bonded to the plastic.

5. The process according to claim 4, wherein the adhesion promoter composition comprises:
- at least one polymer A selected from the group consisting of at least one epoxy resin-phenol resin precondensate, a mixture of at least one epoxy resin-phenol resin precondensate and epoxy resins, a mixture of epoxy resins and phenol resins, polyimide resins and mixtures thereof; and
- at least one copolyamide-based hotmelt adhesive.

6. A metal substrate coated with at least one primer composition according to claim 1.

\* \* \* \* \*